(12) United States Patent
Jindal et al.

(10) Patent No.: US 10,382,307 B1
(45) Date of Patent: Aug. 13, 2019

(54) TRANSMISSION OF SUBSCRIPTION-BASED MESSAGES TO INTERNET OF THINGS (IOT) DEVICES

(71) Applicant: Amazon Technologies, Inc., Seattle, WA (US)

(72) Inventors: Himanshu Jindal, Seattle, WA (US); Paritosh Mohan, Kirkland, WA (US); Nicholas Andrew Gochenaur, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 295 days.

(21) Appl. No.: 15/389,281

(22) Filed: Dec. 22, 2016

(51) Int. Cl.
G06F 15/16 (2006.01)
H04L 12/26 (2006.01)
H04L 12/861 (2013.01)

(52) U.S. Cl.
CPC .......... *H04L 43/0876* (2013.01); *H04L 43/16* (2013.01); *H04L 49/90* (2013.01)

(58) Field of Classification Search
CPC .................................................. H04L 67/2809
USPC ........................................................ 709/229
See application file for complete search history.

(56) References Cited

U.S. PATENT DOCUMENTS

| | | | | |
|---|---|---|---|---|
| 6,970,945 B1 * | 11/2005 | Berkman | ................ | G06F 9/546 709/206 |
| 9,191,236 B2 * | 11/2015 | DeLucca | ................ | H04L 51/14 |
| 9,569,753 B2 * | 2/2017 | Gallant | ................ | G06Q 10/107 |
| 9,815,683 B1 * | 11/2017 | Kalala | ................ | B60P 3/2265 |
| 2008/0133541 A1 * | 6/2008 | Fletcher | ............ | G06F 17/30734 |
| 2010/0082748 A1 * | 4/2010 | Banks | ..................... | G06F 9/542 709/206 |
| 2012/0079044 A1 * | 3/2012 | Dunn | ................. | G06F 17/30867 709/206 |
| 2014/0040389 A1 * | 2/2014 | Beardsmore | ............ | H04L 51/00 709/206 |
| 2015/0156158 A1 * | 6/2015 | Li | ........................... | H04L 67/22 709/207 |
| 2015/0249625 A1 * | 9/2015 | Jensen | .................... | H04L 51/06 709/206 |
| 2016/0087923 A1 * | 3/2016 | Kesavan | ................. | H04L 51/30 709/206 |
| 2016/0134116 A1 * | 5/2016 | Carlson | ................. | H02J 13/002 700/296 |
| 2016/0205106 A1 * | 7/2016 | Yacoub | ............... | H04L 61/1511 726/28 |

(Continued)

Primary Examiner — Hamza N Algibhah
(74) Attorney, Agent, or Firm — Thorpe North & Western, LLP.

(57) ABSTRACT

Technology is described for sending subscription-based messages to devices. A message associated with a defined topic may be received. A first subset of devices may be identified that subscribe to the defined topic. A first subset of messages may be provided to a message queue for transmission to devices indicated in the first subset of devices. A second subset of devices may be identified that subscribe to the defined topic. A second subset of messages may be provided to the message queue for transmission to devices indicated in the second subset of devices. The second subset of messages may include an increased subset size as compared to the first subset of messages. The subset size may be increased at a rate to enable sending the message to the plurality of device subscribed to the defined topic within a defined time period.

20 Claims, 9 Drawing Sheets

(56) References Cited

U.S. PATENT DOCUMENTS

| | | | | |
|---|---|---|---|---|
| 2016/0366111 A1* | 12/2016 | Smith | ............... | H04L 67/125 |
| 2017/0012916 A1* | 1/2017 | Lieu | ............... | H04L 51/066 |
| 2017/0180289 A1* | 6/2017 | Chiappone | ............... | H04L 67/22 |
| 2017/0187642 A1* | 6/2017 | Nolan | ............... | H04W 4/70 |
| 2018/0034760 A1* | 2/2018 | Hoffner | ............... | H04L 51/18 |

* cited by examiner

TRANSMISSION OF SUBSCRIPTION-BASED MESSAGES TO INTERNET OF THINGS (IOT) DEVICES

BACKGROUND

The Internet of Things (IoT) is the interconnection of computing devices scattered across the globe using the existing internet infrastructure. IoT devices may be assigned a unique identifier, such as an Internet Protocol version 6 (IPv6) address, an IPv4 address, a uniform resource identifier (URI), or a global unique identifier. IoT devices may securely communicate data over a network to a centralized IoT service in a service provider environment. The IoT devices may register with the IoT service prior to communicating the data to the IoT service.

IoT devices may be embedded in a variety of physical devices or products, such as industrial equipment, farm machinery, home appliances, manufacturing devices, industrial printers, automobiles, thermostats, smart traffic lights, vehicles, buildings, etc. These physical devices may have embedded electronics, software, sensors, and network connectivity that enables these physical devices to collect and exchange data. IoT may be useful for a number of applications, such as environmental monitoring, farming, infrastructure management, industrial applications, building and home automation, energy management, medical and healthcare systems, transport systems, etc.

DETAILED DESCRIPTION

Figure 1:
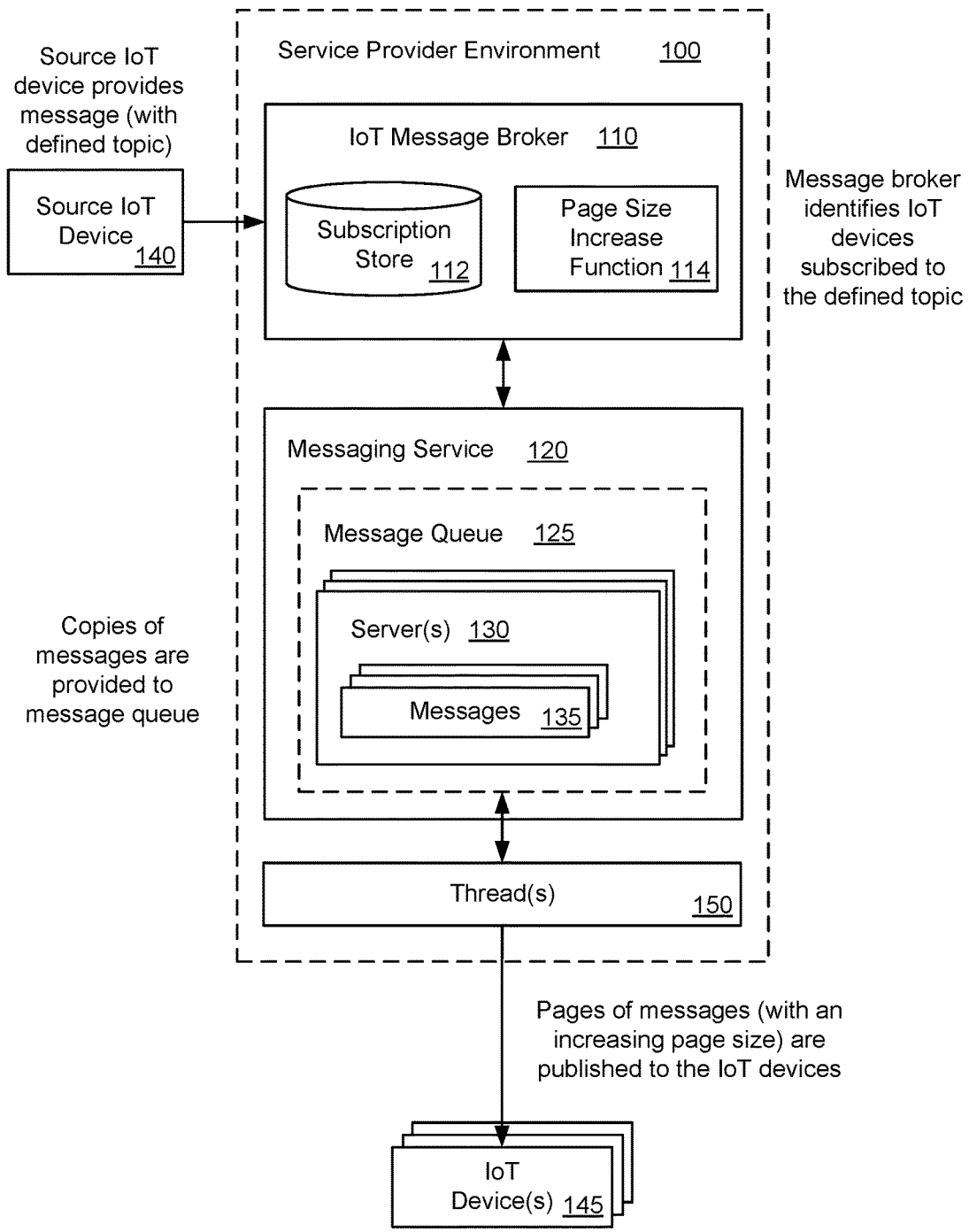
FIG. 1 illustrates a system and related operations for publishing a message with a defined topic from an Internet of Things (IoT) message broker to a plurality of IoT devices that subscribe to the defined topic according to an example of the present technology.

A technology is described for publishing a message with a defined topic to a plurality of Internet of Things (IoT) devices that subscribe to the defined topic via a publish-subscribe messaging service in a service provider environment. An IoT message broker in the service provider environment may utilize a subscription store to determine which IoT devices are subscribed to the defined topic. The IoT message broker may send a page (or subset) of messages to each page (or subset) of IoT devices (i.e., the same message repeated to each device) that subscribe to the defined topic. The IoT message broker may increase a page size over time using a page size increase function, which may increase at a rate to enable sending the messages to the plurality of IoT devices subscribed to the defined topic within a defined time period.

In one configuration, the IoT message broker may receive a message from a source IoT device. The message may be associated with a defined topic. The IoT message broker may determine to publish or forward the message to a plurality of IoT devices that have subscribed to the defined topic. In other words, the plurality of IoT devices may have an interest in messages with the defined topic, so when the IoT message broker receives a new message with the defined topic, the IoT message broker may publish or forward the message to the plurality of IoT devices. The plurality of IoT devices may have previously subscribed to messages with the defined topic, and information related to IoT device subscriptions may be known to the IoT message broker. The IoT message broker may utilize the information related to IoT device subscriptions when publishing or forwarding the message to the plurality of IoT devices.

In one configuration, the IoT message broker may send the message with the defined topic to the plurality of IoT devices by retrieving a list of the subscribed IoT devices on a page-by-page basis, where each page includes a certain number of subscribers to be sent the message. The IoT message broker may utilize a page size increase function to determine a number of IoT devices to be sent a message in each page. The IoT message broker may increase the number of IoT device per page over time in accordance with the page size increase function, which may result in the messages being sent to the entire group of the plurality of IoT devices subscribed to a message topic within a defined time period. The IoT message broker may determine the page size increase function based on a combination of: a number of IoT devices that subscribe to the defined topic, a targeted period of time for transmitting messages to the IoT devices, a targeted number of pages to be utilized for transmitting the messages to the IoT devices, and/or a failure risk factor for each page of messages that are transmitted to the IoT devices.

In another example, the IoT message broker may determine the page size increase function using topic based heuristics or account based heuristics. For example, certain topics or accounts may be associated with a relatively high or low number of subscriptions. In these cases, a relatively high value or low value may be selected for an initial page size, and then the page size may increase accordingly (e.g., using a page size increase function that is determined using topic based heuristics or account based heuristics). In yet another example, the IoT message broker may determine the page size increase function based on machine learning based heuristics.

As examples, the page size increase function may define a rate of increase between each successive page of devices to be linear, exponential, stepwise, in accordance with a defined pattern (e.g., the rate of increase may be a factor of 10 for a successive page, and then a factor of 9 for a successive page, and then a factor of 8 for a successive page, and so on), etc.

In one example, the IoT message broker may request, from the subscription store, a first page of IoT devices from the plurality of IoT devices that subscribe to the defined topic. The IoT message broker may select a page size (e.g., 50 or 100 IoT devices) for the first page of IoT devices based on the page size increase function. The subscription store may also maintain a tree data structure that indicates a plurality of IoT devices that subscribe to messages corresponding to a plurality of defined topics. The subscription store may search the tree data structure, and then return the first page of IoT devices to the IoT message broker. The IoT message broker may provide a first page of IoT devices subscribed to receiving messages to a message queue for transmission to IoT devices indicated in the first page of IoT devices. The first page of messages may include copies of the message associated with the defined topic. The IoT message broker may then request, from the subscription store, a second page of IoT devices from the plurality of IoT devices that subscribe to the defined topic. The subscription store may search the tree data structure, and then return the second page of IoT devices to the IoT message broker. The IoT message broker may provide a second page of IoT devices and messages to the message queue for transmission to IoT devices indicated in the second page of IoT devices. The IoT message broker may continue to request additional pages of IoT devices from the subscription store and send additional pages of messages until each of the plurality of IoT devices that subscribe to the defined topic receive the message with the defined topic.

In one configuration, a page size for each page of messages may increase over time in accordance with the page size increase function. As a result, the IoT message broker may be able to send the messages to the plurality of IoT device subscribed to the defined topic within a defined time period.

As a non-limiting example, the source IoT device may be a rain sensor in region A. The source IoT device may send a message with rain sensor information for region A to the IoT message broker. In this case, the defined topic associated with the message may be rain sensor information for region A. The IoT message broker may determine to publish the message with the rain sensor information for region A to a plurality of IoT devices that subscribe to this defined topic. The plurality of IoT devices may be vehicles, farm equipment, etc. that have an interest in rain sensor information for region A. For example, the plurality of IoT devices may utilize the rain sensor information to perform various functions, such as turning on or off, adjusting settings, etc.

Continuing with the above non-limiting example, the IoT message broker may request, from the subscriptions store, a first page of 100 IoT devices (e.g., vehicles, farm equipment, thermostats) that subscribe to the defined topic. The IoT message broker may initially select a page size of 100 based on the page increase size function. These 100 IoT devices may be a portion of a total number of IoT devices that subscribe to the defined topic. The subscription store may return the first page of 100 IoT devices. The IoT message broker may provide a first page of 100 messages (corresponding to the 100 IoT devices) to the message queue for transmission to the 100 IoT devices indicated in the first page of 100 IoT devices. The first page of 100 messages may be copies of the message received from the source IoT device. Then, the IoT message broker may request, from the subscription store, a second page of 500 IoT devices that subscribe to the defined topic. The IoT message broker may utilize a page size of 500 based on the page increase size function. In other words, the IoT message broker may determine to increase the page size from 100 to 500 based on the page increase size function. The subscription store may return the second page of 500 IoT devices. The IoT message broker may provide a second page of 500 messages (corresponding to the 500 IoT devices) to the message queue for transmission to the 500 IoT devices indicated in the second page of 500 IoT devices.

Continuing with the above non-limiting example, the IoT message broker may continue to request additional pages of IoT devices from the subscription store and send additional pages of messages until each of the plurality of IoT devices that subscribe to the defined topic receive the message with the defined topic. As an example, the IoT message broker may increase a page size to 2500, 10,500 and so on in subsequent requests until each of the plurality of IoT devices that subscribe to the defined topic receive the message with the defined topic. In this example, the IoT message broker may send the message to a total of 100,000 IoT devices that subscribe to the defined topic.

As another non-limiting example, the plurality of IoT devices may be devices that perform a defined action (e.g., light up, make a sound) when a defined event occurs in a sporting event (e.g., a touchdown or basket is scored in a sporting event). These devices may be connected to a television that is playing the sporting event. When the defined event occurs, the IoT message broker may send a message to each device to instruct the device to perform the defined action. The IoT message broker may ensure that the messages are sent to the devices within a relatively short period of time so that the device performs the defined action relatively soon after the defined event occurs in the sporting event. For example, if the device were to flash a light emitting diode (LED) representing a scoring event 5 minutes after a touchdown is scored in a football game, this may not create a positive experience for a user watching the football game.

FIG. 1 illustrates an exemplary system and related operations for publishing a message 135 for a defined topic from an Internet of Things (IoT) message broker 110 to a plurality of IoT devices 145 that subscribe to the defined topic. The IoT message broker 110 may operate in a service provider environment 100. The IoT message broker 110 may be a publish-subscribe broker service that enables the sending and receiving of messages 135 between IoT devices 145 using topics. The IoT message broker 110 may be in communication with a messaging service 120 that operates in the service provider environment 100. The messaging service 120 may operate a message queue 125. The message queue 125 may include one or more servers 130 that store the messages 135. In one example, the messages 135 may be provided from the IoT message broker 110 to the message queue 125 for transmission to the IoT devices 145.

In one configuration, a source IoT device 140 may wish to send a message 145 with a defined topic to the plurality of IoT devices 145. Rather than send the message 145 directly to the plurality of IoT devices 145, the source IoT device 140 may use the IoT message broker 110 to publish the message 145 to the plurality of IoT devices 145. The source IoT device 140 may send the message 145 with the defined topic to the IoT message broker 110, and the IoT message broker 110 may determine to publish or forward the message 135 to the plurality of IoT devices 145 that subscribe to the defined topic. In other words, the plurality of IoT devices 145 may have an interest in messages 135 with the defined topic (as defined by a subscription), so when the IoT message broker 110 receives the message 135 with the defined topic from the source IoT device 140, the IoT message broker 110 may publish or forward the message 135 to the plurality of IoT devices 145.

In one example, the IoT message broker 110 may include, or have access to, a subscription store 112. The subscription store 112 may maintain a tree data structure that indicates a plurality of IoT devices 145 that subscribe to messages 135 corresponding to a plurality of defined topics. With access to the subscription store 112, the IoT message broker 110 may know which IoT messages 145 subscribe to messages 135 with the defined topic.

In one example, the IoT message broker 110 may request, from the subscription store 112, a page (or subset) of IoT devices that subscribe to the defined topic. The subscription store 112 may determine the page of IoT devices, and then return the page of IoT devices to the IoT message broker 110. The IoT message broker 110 may provide a page (or subset) of messages 135 to the message queue 125. The page of messages 135 may include copies of the message 145 with the defined topic received from the source IoT device 140. In another example, the IoT message broker 110 may enque the messages 135 as an asynchronous message to be sent by the message queue 125, and the asynchronous message may involve the messages 135 being sent from the message queue 125 to the IoT devices 145.

The IoT message broker 110 may determine a page size for the page of IoT devices (and the corresponding page of messages) to be retrieved using a page size increase function 114. The page size increase function 114 may define an initial page size as well as subsequent page sizes to be utilized by the IoT message broker 110. Based on the page size increase function 114, the page size may increase over time at a rate that is exponential or linear. Alternatively, based on the page size increase function 114, the page size may increase over time at a rate that is in accordance with a defined pattern or function.

In one example, one or more threads 150 executing in the service provider environment 100 may poll the message queue 125 for messages 135 that are waiting to be processed for transmission to the IoT devices 145. In this case, after polling the message queue 125, the one or more threads 150 may pick up the messages 135 (e.g., messages from the first page) and transmit the messages 135 to the IoT devices 145 indicated in the page of IoT devices. In this example, the one or more threads 150 may send each message 135 from the page of messages 135 to an appropriate IoT device 145.

In one configuration, when the subscription store 112 returns the page of IoT devices, the subscription store 112 may include a token with the page of IoT devices to indicate that additional IoT devices 145 are subscribed to the defined topic. In other words, the inclusion of the token may inform the IoT message broker 110 to make at least one subsequent request for a page of IoT devices from the plurality of IoT devices 145 that subscribe to the defined topic. When the token is received, the IoT message broker 110 may request, from the subscription store 112, a subsequent page of IoT devices. The IoT message broker 110 may include the token with the request for the subsequent page of IoT devices. The IoT message broker 110 may increase the page size for the request for the subsequent page of IoT devices in accordance with the page size increase function 114. Similar to what is described above, the IoT message broker 110 may provide a subsequent page of messages 135 to the message queue 125 for transmission to the IoT devices 145 indicated in the subsequent page of IoT devices.

In one example, the IoT message broker 110 may continue to request additional pages of IoT devices from the subscription store 112 and send additional pages of messages 135 until each of the plurality of IoT devices 145 that subscribe to the defined topic receive the message 135 with the defined topic. In one example, when the IoT message broker 110 does not receive the token from the subscription store 112, the IoT message broker 110 may determine that there are no additional pages of IoT devices to be returned by the subscription store 112. At this point, the IoT message broker 110 may stop requesting additional pages of IoT devices from the subscription store 112.

In one configuration, the one or more threads 150 may poll the message queue 125 for outstanding messages 135 to be sent to the IoT devices 145. A number of threads 150 that are utilized may be modified depending on a frequency at which messages 135 are produced when polling the message queue 125. As an example, the number of threads 150 may be increased when polling the message queue 125 produces a number of messages 135 that are above a defined threshold. As another example, the number of threads 150 may be decreased when polling the message queue 125 produces a number of messages 135 that are below the defined threshold.

In the past, publish-subscribe messaging services or systems would request pages of IoT devices from the subscription store 112 with a fixed page size. For example, in previous solutions, the IoT message broker 110 would request a first 100 IoT devices from the subscription store 112, the IoT message broker 110 would request a second 100 IoT devices from the subscription store 112, and so on. However, when the IoT message broker 110 was to send a relatively large number of messages 135, the number of pages that were to be requested from the subscription store 112 was also relatively large. As a result, in previous solutions, sending out a relatively large number of messages 135 would take a relatively long period of time because of the large number of page request that may take place. In addition, in previous solutions, it would be difficult to determine an optimum fixed page size since a relatively large page size would result in the communication of increased payloads (e.g., pages with more data that use more bandwidth) between the message broker 110 and the subscription store 112. Whereas, a relatively small page size would result in an increased amount of time to send the messages 135 due to an increased number of calls between the message broker 110 and the subscription store 112.

In contrast, in the present technology, the IoT message broker 110 may request pages of IoT devices from the subscription store 112 using the page size increase function. In accordance with the page size increase function, the page size associated with the request for IoT devices may increase each time the IoT message broker 110 requests a page of IoT devices from the subscription store 112. By increasing the page size for each iteration, the IoT message broker 110 may be able to send an increased number of messages 135 in a reduced amount of time. This increase in speed is true where the number of messages becomes increasingly large. In the present technology, sending the message 135 to a relatively small group of IoT devices 145 may be handled efficiently since the page size initially starts as a relatively small value. In addition, sending the message 135 to a relatively large group of IoT devices 145 may be handled efficiently since the page size can, for example, increase exponentially or linearly over time.

In one example, the page size may be less than a defined maximum value. The defined maximum value may be selected to minimize an amount of time for sending the messages 135 to the plurality of IoT device 145 subscribed to the defined topic. In addition, the defined maximum value may be selected based on a failure risk factor for each page of messages 135 that is transmitted to the IoT devices 145. The failure risk factor may increase as the page size increases because if a failure were to occur for a given page, the entire process for that page may have to be repeated. For example, if an error occurs when a page of messages 135 is transmitted from the message queue 125 to the IoT devices 145, the page of messages 135 may have to be provided again to the message queue 125 for retransmission to the IoT devices 145. Therefore, the amount of time for sending the messages 135 may be balanced with the failure risk factor when setting the defined maximum value for the page size. In addition, although a payload (e.g., pages) to be communicated between the subscription store 112 and the IoT message broker 110 may increase with the page size, the page size may be less than the defined maximum value.

In an alternative configuration, the IoT message broker 110 may request the subscription store 112 to return a number of IoT devices 145 that subscribe to the defined topic. The subscription store 112 may receive the request, and then traverse the tree data structure to determine the number of IoT devices 145 that are subscribed to the defined topic. Based on the number of IoT devices 145, the IoT message broker 110 may determine the page size increase function 114. In addition, the IoT message broker 110 may determine the page size increase function 114 based on a targeted period of time for transmitting messages 135 to the IoT devices 145, a targeted number of pages to be utilized for transmitting the messages 135 to the IoT devices 145, and a failure risk factor for each page of messages 135 that are transmitted to the IoT devices 145. After determining the page size increase function 114, the IoT message broker 110 may send requests to the subscription store 112 for pages of IoT devices, and the pages of IoT devices may have optimum page sizes based on the page size increase function 114.

Figure 2:
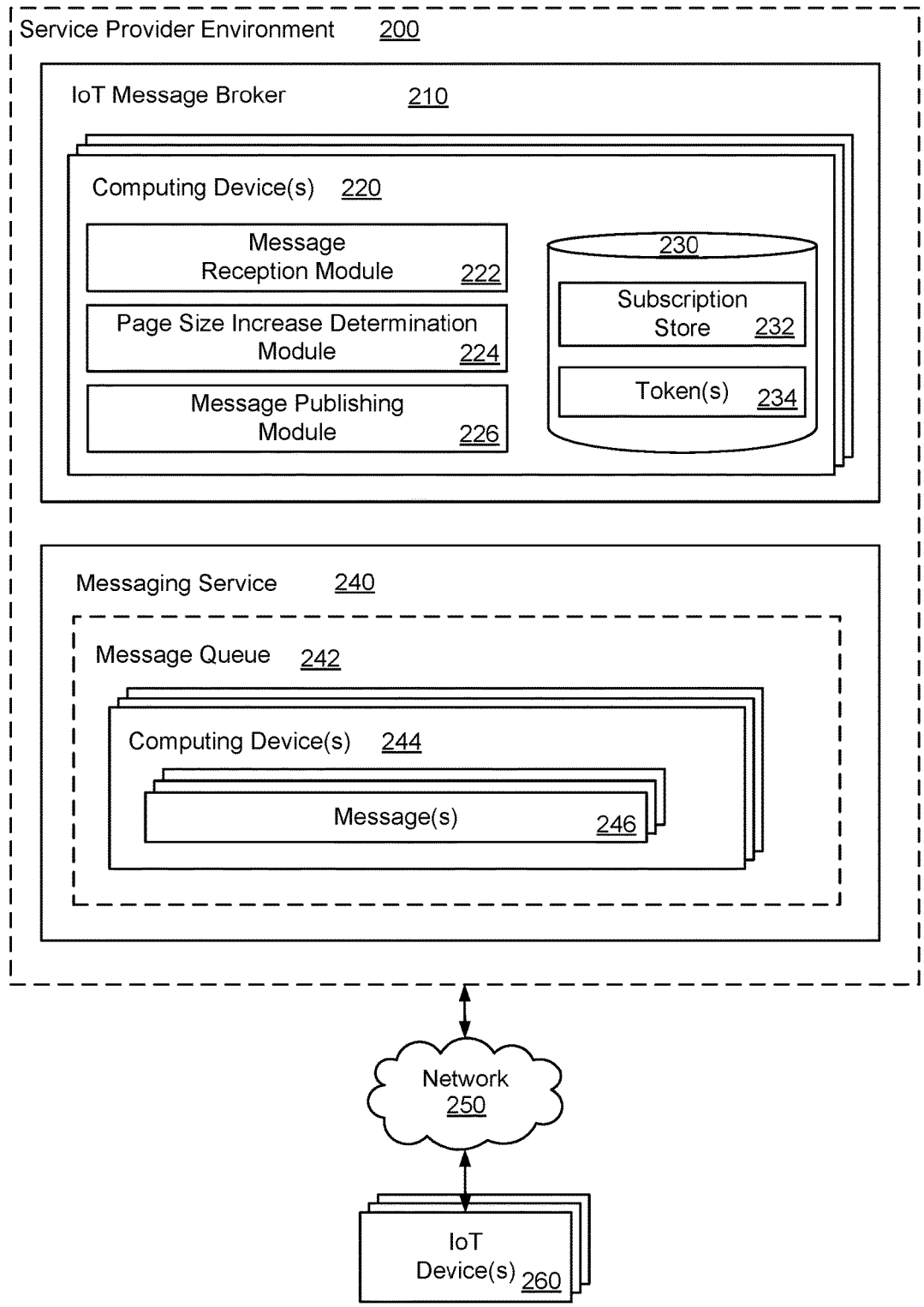
FIG. 2 is an illustration of a networked system for publishing a message with a defined topic to a plurality of Internet of Things (IoT) devices that subscribe to the defined topic according to an example of the present technology.

FIG. 2 illustrates components of an example service provider environment 200 according to one example of the present technology. The service provider environment 200 may include an Internet of Things (IoT) message broker 210 and a messaging service 240. The IoT message broker 210 may operate one or more computing devices 220 and data store(s) 230 to publish a message 246 with a defined topic to a plurality of IoT devices 260 that subscribe to the defined topic. The message service 240 may operate a message queue 242. The message queue 242 may include a plurality of computing devices 244 that store messages 246. The messages 246 in the message queue 242 may be copies of the message 246 for the defined topic that is being published by the IoT message broker 210 to multiple IoT devices 260. The messages 246 stored in the message queue 242 may be provided to the plurality of IoT devices 260 via a network 250.

In one example, the data store 230 may include a subscription store 232. The subscription store 232 may maintain a tree data structure that indicates a plurality of IoT devices 260 that subscribe to messages 246 corresponding to a plurality of defined topics. In one specific example, the tree data structure may be a trie. The tree data structure may include a plurality of user accounts, and the user accounts may be associated with the plurality of IoT devices 260. For each user account, the tree data structure may include subscriptions for defined topics. As an example, a certain user account may subscribe to many defined topics. Alternatively, the tree data structure may include the plurality of defined topics, and for each defined topic, the tree data structure may indicate user accounts (or IoT devices 260) that subscribe to the defined topic. In one example, the tree data structure may be continually updated as user accounts (or IoT devices 260) subscribe or unsubscribe to defined topics.

In one configuration, the subscription store 232 may receive a request from the IoT message broker 210 for a page of IoT devices that subscribe to a certain topic. The request may indicate a page size for the page of IoT devices that subscribe to the certain topic. In response to the request, the subscription store 232 may search the tree data structure and identify the page of IoT devices (with an appropriate page size) that subscribe to the certain topic. The subscription store 232 may return the page of IoT devices to the IoT message broker 210.

In one example, the data store 230 may include tokens 234. The tokens 234 may be security tokens or authentication tokens. A token 234 may be returned with a page of IoT devices from the subscription store 232. In one example, the token 234 may be returned with the page of IoT devices to indicate that there are additional IoT devices 260 that subscribe to the defined topic. Therefore, the token 234 may be used when a subsequent page of IoT devices is requested from the subscription store 232. In addition, when the token 234 is not returned with the page of IoT devices, there may be no additional IoT devices 260 that subscribe to the defined topic.

In an alternative configuration, a token 234 may be generated and returned with the page of IoT devices when there are additional IoT devices 260 that subscribe to the defined topic. In this alternative configuration, the token 234 may not be stored in the data store 230.

The computing device(s) 220 operated by the IoT message broker 210 may include a number of modules for publishing the messages 246 to the plurality of IoT devices 260. The computing device(s) 220 may include a message reception module 222, a page size increase determination module 224, a message publishing module 226, and other applications, services, processes, systems, engines, or functionality not discussed in detail herein.

The message reception module 222 may be configured to receive a message 246 for a defined topic. The message reception module 222 may receive the message 246 from a source IoT device (not shown). The message reception module 222 may determine to publish or send the message 246 with the defined topic to the plurality of IoT devices 260 that subscribe to the defined topic.

The page size increase determination module 224 may be configured to determine a page size increase function to be utilized when pages of IoT devices are requested from the subscription store 232. In other words, the page size increase function may be used to determine the page size for each request that is sent to the subscription store 232. Similarly, the page size may correspond to pages of messages 246 that are sent to the message queue 242. In one example, the page size increase determination module 224 may determine the page size increase function based on at least one of: a number of IoT devices 260 that subscribe to the defined topic, a targeted period of time for transmitting messages 246 to the IoT devices 260, a targeted number of pages to be utilized for transmitting the messages 246 to the IoT devices 260, or a failure risk factor for each page of messages 246 that are transmitted to the IoT devices 260. The page size increase function may also be determined using a combination of these factors. As examples, the page size increase function may define a rate of increase between each successive page of messages 246 to be linear, exponential, in accordance with a defined pattern, stepwise, quadratic, a portion of a cubic function, etc.

The message publishing module 226 may be configured to identify pages of IoT devices that subscribe to the defined topic. The message publishing module 226 may identify the pages of IoT devices using the subscription store 232. The message publishing module 226 may provide, to the message queue 242, pages of messages 246 for transmission to the plurality of IoT devices 260 indicated in the pages of IoT devices. In most configurations, one page at a time will be retrieved. However, multiple pages may be retrieved for each request, if desired. Each page of messages 246 may include copies of the message 246 associated with the defined topic destined for the plurality of IoT devices 260, and the copies of the messages 246 may be added by the message publishing module 226. In one example, the message publishing module 226 may obtain a page size for each request for a page of IoT devices (and corresponding page of messages 246) using the page size increase function as managed by the page size increase determination module 224. In addition, the message publishing module 226 may obtain an increase the page size over time in accordance with the page size increase function, such that the messages 260 are sent to the plurality of IoT devices 260 subscribed to the defined topic within a defined time period.

The IoT device 260 may comprise, for example a processor-based system such as a computing system. As non-limiting examples, the IoT device 260 may include consumer products (e.g., rice cookers, printers, scanners, digital picture frames, toys), home automation products (e.g., smart thermostats, smart refrigerators, heating, air conditioning, etc.), manufacturing devices, farming devices, factory devices, industrial metal stamping devices, industrial robots, sensors, drones, or other devices that are assigned unique identifiers and are capable of communicating data over the network 250. Commercial devices may also be included in the definition of the IoT device 260, including: commercial printing presses, commercial freezers, commercial kilns, commercial mixers or other commercial equipment.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
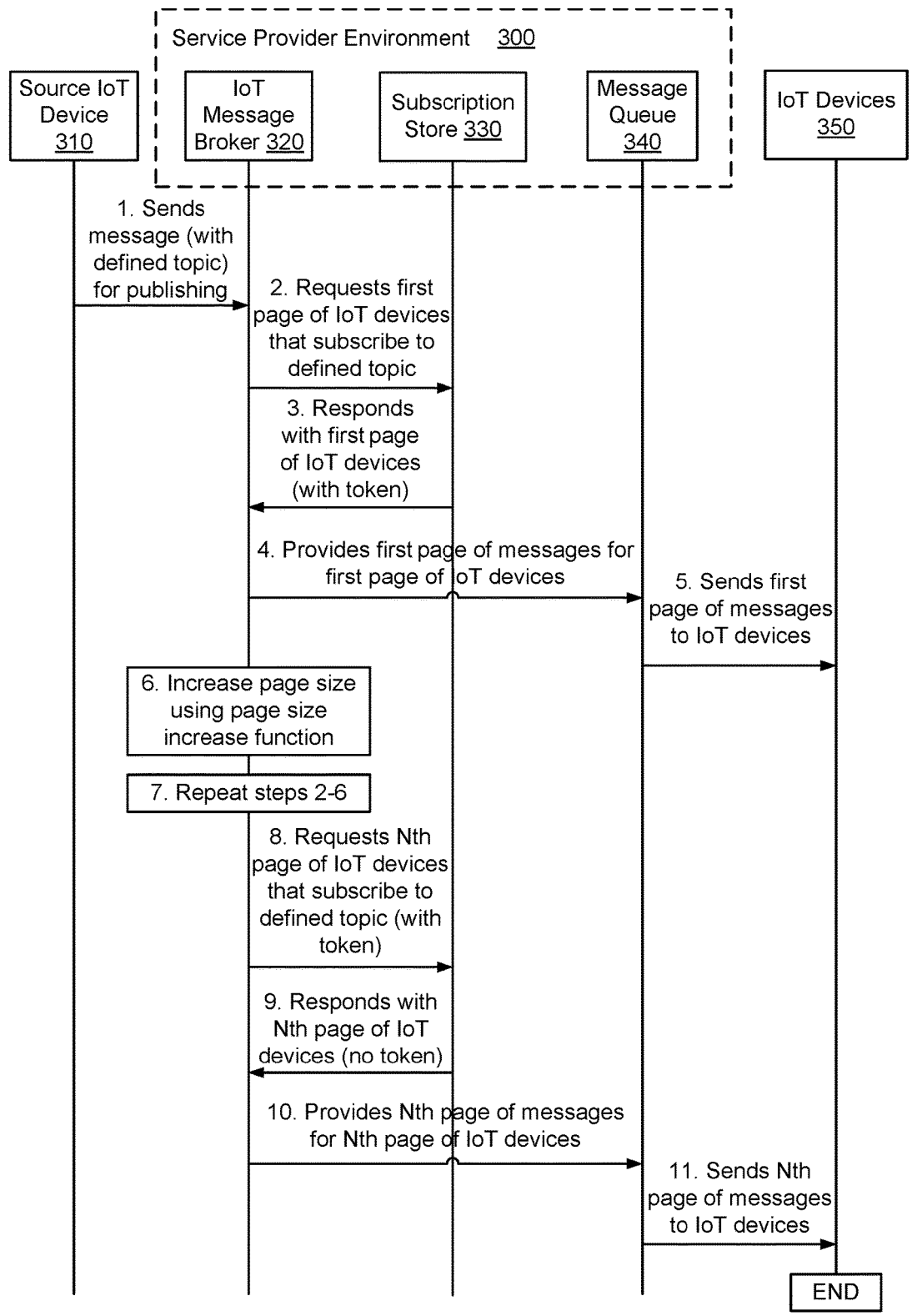
FIG. 3 illustrates operations for publishing a message with a defined topic to a plurality of Internet of Things (IoT) devices that subscribe to the defined topic according to an example of the present technology.

FIG. 3 illustrates an example of operations for publishing a message with a defined topic to a plurality of Internet of Things (IoT) devices 350. The message may be received from a source IoT device 310, and then published to the plurality of IoT devices 350. More specifically, the message may be published using an IoT message broker 320, a subscription store 330 and a message queue 340 in a service provider environment 300.

In a first step, the source IoT device 310 may determine to publish the message with the defined topic. In other words, the source IoT device 310 may wish to send the message with the defined topic to the plurality of IoT devices 350 that subscribe to the defined topic. The source IoT device 310 may send the message with the defined topic to the IoT message broker 320.

In a second step, the IoT message broker 320 may receive the message with the defined topic. The IoT message broker 320 may request, from the subscription store 330, a first page of IoT devices that subscribe to the defined topic. The IoT message broker 320 may determine a page size for the first page of IoT devices using a page size increase function.

In a third step, the subscription store 330 may receive the request for the first page of IoT devices from the IoT message broker 320. The subscription store 330 may search a tree data structure, and then return the first page of IoT devices to the IoT message broker 320. In addition, the subscription store 330 may return a token to indicate that there are additional pages of IoT devices that subscribe to the defined topic.

In a fourth step, the IoT message broker 320 may provide a first page of messages to the message queue 340. The first page of messages may correspond to the first page of IoT devices received from the subscription store 330. In other words, one message may be designated for one IoT device. The first page of messages may include copies of the message with the defined topic received from the source IoT device 310.

In a fifth step, the message queue 340 may send the first page of messages to IoT devices 350 indicated in the first page of IoT devices. In one example, one or more threads may poll the message queue 340 and pick up messages that are waiting to be sent, and then the one or more threads may send the messages to the IoT devices 350.

In a sixth step, the IoT message broker 320 may increase the page size in accordance with the page size increase function. In one example, the IoT message broker 320 may increase the page size linearly or exponentially. In another example, the IoT message broker 320 may increase the page size in accordance with a defined pattern.

In a seventh step, steps 2 through 6 may be repeated a defined number of times. In other words, the IoT message broker 320 may continue to request pages of IoT devices that subscribe to the defined topic from the subscription store 330, the subscription store 330 may return the pages of IoT devise, the IoT message broker 320 may provide pages of messages (corresponding to the pages of IoT devices) to the message queue 340, and the message queue 340 may send the pages of messages to IoT devices 350 indicated in the pages of IoT devices. In addition, the IoT message broker 320 may increase the page size in accordance with the page size increase function before sending a subsequent request to the subscription store 330.

In an eight step, the IoT message broker 320 may request, from the subscription store 330, an Nth page of IoT devices that subscribe to the defined topic, where N is an integer. The IoT message broker 320 may include the token with the request.

In a ninth step, the subscription store 330 may return the Nth page of IoT devices to the IoT message broker 320. In this example, the subscription store 330 may not include the token, which may indicate that there are no additional pages of IoT devices that subscribe to the defined topic. In an alternative example, the subscription store 330 may return the Nth page of IoT devices to the IoT message broker 320, and the subscription store 330 may include a token that specifies that there are no additional pages of IoT devices that subscribe to the defined topic.

In a tenth step, the IoT message broker 320 may provide an Nth page of messages to the message queue 340. The Nth page of messages may correspond to the Nth page of IoT devices received from the subscription store 330.

In an eleventh step, the message queue 340 may send the Nth page of messages to IoT devices 350 indicated in the Nth page of IoT devices.

In this example, since the subscription store 330 does not return the token in the ninth step, the IoT message broker 320 may not send additional requests to the subscription store 330. At this point, the message with the defined topic received from the source IoT device 310 may be published or forwarded to each of the plurality of IoT devices 350 that subscribe to the defined topic.

Figure 4:
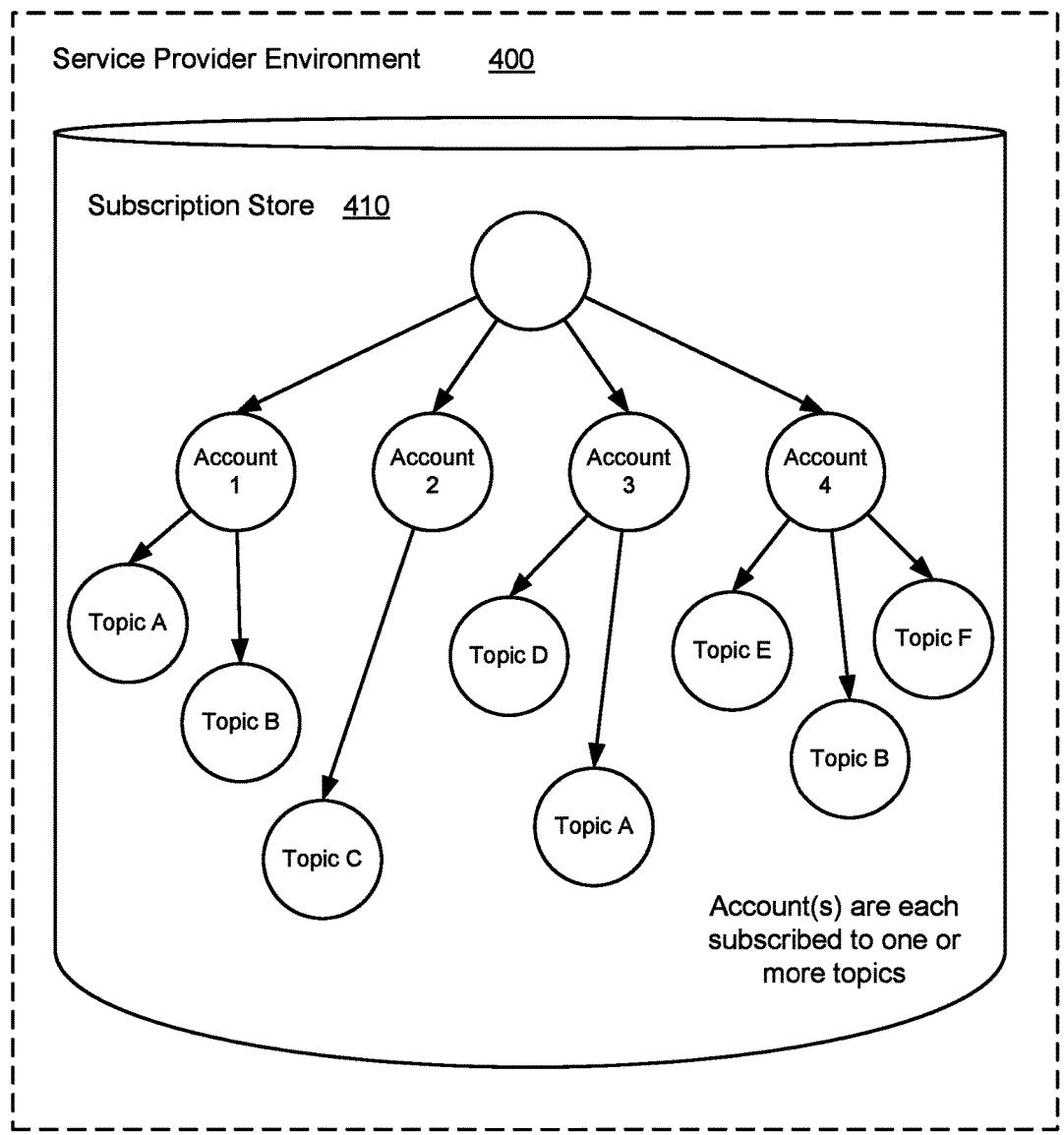
FIG. 4 illustrates a subscription store with a tree data structure that indicates a plurality of Internet of Things (IoT) devices that subscribe to messages corresponding to a plurality of defined topics according to an example of the present technology.

FIG. 4 illustrates an exemplary subscription store 410 in a service provider environment 400. The subscription store 410 may be stored on one or more servers in the service provider environment 400. For example, the subscription store 410 may be stored on a single server in the service provider environment 400, or alternatively, the subscription store 410 may be stored across a plurality of servers in the service provider environment 400. The subscription store 410 may include a tree data structure that indicates a plurality of user accounts and/or Internet of Things (IoT) devices that subscribe to messages corresponding to a plurality of defined topics according. The subscription store 410 may be part of or accessible to an IoT message broker (not shown) in the service provider environment 400. In one specific example, the tree data structure included in the subscription store 410 may be a trie.

The subscription store 410 may traverse or search the subscription store 410 in order to identify specific user accounts and/or IoT devices that subscribe to certain topics. For example, when subscription store 410 receives a request to identify 100 user accounts (or IoT devices) that subscribe to topic A, the subscription store 410 may traverse or search the subscription store 410 to identify the identify 100 user accounts (or IoT devices) that subscribe to topic A.

In the example shown in FIG. 4, the tree data structure may include a plurality of user accounts, such as account 1, account 1, account 3 and account 4. For each user account, the tree data structure may include subscriptions for defined topics. For example, account 1 may subscribe to topics A and B, account 1 may subscribe to topic C, account 3 may subscribe to topics D and A, and account 4 may subscribe to topics E, B and F.

In an alternative configuration, the tree data structure may include the plurality of defined topics, and for each defined topic, the tree data structure may indicate user accounts (or IoT devices) that subscribe to the defined topic. For example, the plurality of defined topics may include topic 1, topic 2, topic 3 and topic 4. In this example, topic 1 may be subscribed to by user accounts A, B and C, topic 2 may be subscribed to by user account C, topic 3 may be subscribed to by user accounts D and A, and topic 4 may be subscribed to by user accounts E, B and F.

In yet another alternative configuration, the subscription store 410 may include a plurality of tree data structures. In this configuration, one tree data structure may be assigned to a specific account and includes subscription nodes. In addition, the subscription store 410 may maintain a mapping of the tree data structures to corresponding accounts. The mapping may utilize key-value pairs. In this example, a key may be an account identifier (ID) and a corresponding value may be a tree data structure for a designated account (i.e., an account with the same account ID).

Figure 5:
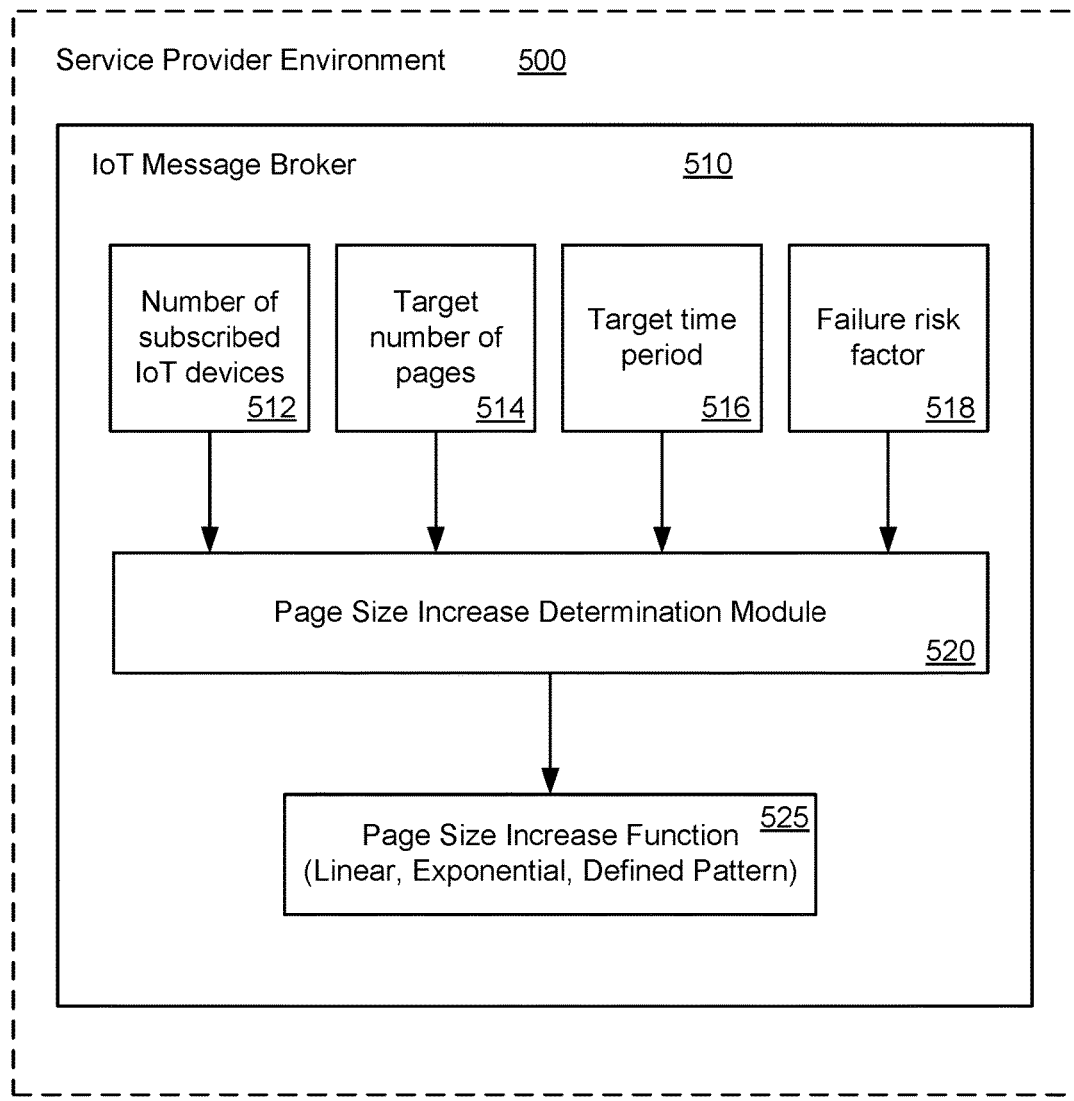
FIG. 5 illustrates operations for determining a page size increase function according to an example of the present technology.

FIG. 5 illustrates exemplary operations for determining a page size increase function 525 in a service provider environment 500. An Internet of Things (IoT) message broker 510 in the service provider environment 500 may utilize the page size increase function 525 when requesting pages of IoT devices from a subscription store and sending pages of messages to a plurality of IoT devices. In other words, based on the page size increase function 525, the IoT message broker 510 may select appropriate page sizes when requesting the pages of IoT devices from the subscription store and sending the pages of messages to the plurality of IoT devices.

In one configuration, the IoT message broker 510 may include a page size increase determination module 520. The page size increase determination module 520 may include a number of factors to determine the page size increase function 525. For example, the page size increase determination module 520 may utilize a total number of IoT devices 512 that subscribe to a defined topic when determining the page size increase function 525. The page size increase function 525 may be adjusted appropriately depending on whether the number of IoT devices 512 is relatively larger (e.g., one million) or relatively smaller (e.g., 1,000). The page size increase determination module 520 may utilize a target number of pages 514 when determining the page size increase function 525. In some use cases, the IoT message broker 510 may want to send the messages using a limited number of pages, which may reduce signaling time (e.g., bandwidth consumed) between the IoT message broker 510 and a subscription store. Generally speaking, the page size may be increased when the target number of pages 514 is reduced. The target number of pages 514 may be more important for certain use cases as compared to others.

The page size increase determination module 520 may utilize a target time period 516 when determining the page size increase function 525. The IoT message broker 510 may want to request the pages of IoT devices and send the pages of messages in a reduced amount of time. The target time period 516 may be more important for certain use cases as compared to others. Generally speaking, the page size may be increased when the target time period 516 is reduced.

In addition, the page size increase determination module 520 may utilize a failure risk factor 518 when determining the page size increase function 525. The failure risk factor 518 may increase per page as the page size increases because if a failure were to occur for a given page, the entire process for that page may have to be repeated.

Based on the number of IoT devices 512 subscribing to the defined topic, the target number of pages 514, the target time period 516 and/or the failure risk factor 518, the page size increase determination module 520 may determine the page size increase function 525. The page size increase function 525 may define an initial value for the page size, and then define a rate of increase for successive pages. In one example, the page size increase function 525 may define the rate of increase between successive pages to be linear (e.g., the rate of increase may be a fixed factor of 100 for each successive page). In another example, the page size increase function 525 may define the rate of increase between successive pages to be exponential (e.g., the rate of increase may increase exponentially over time). In yet another example, the page size increase function 525 may define the rate of increase between successive pages to be in accordance with a defined pattern (e.g., the rate of increase may be a factor of 10 for a successive page, and then a factor of 9 for a successive page, and then a factor of 8 for a successive page, and so on).

Figure 6:
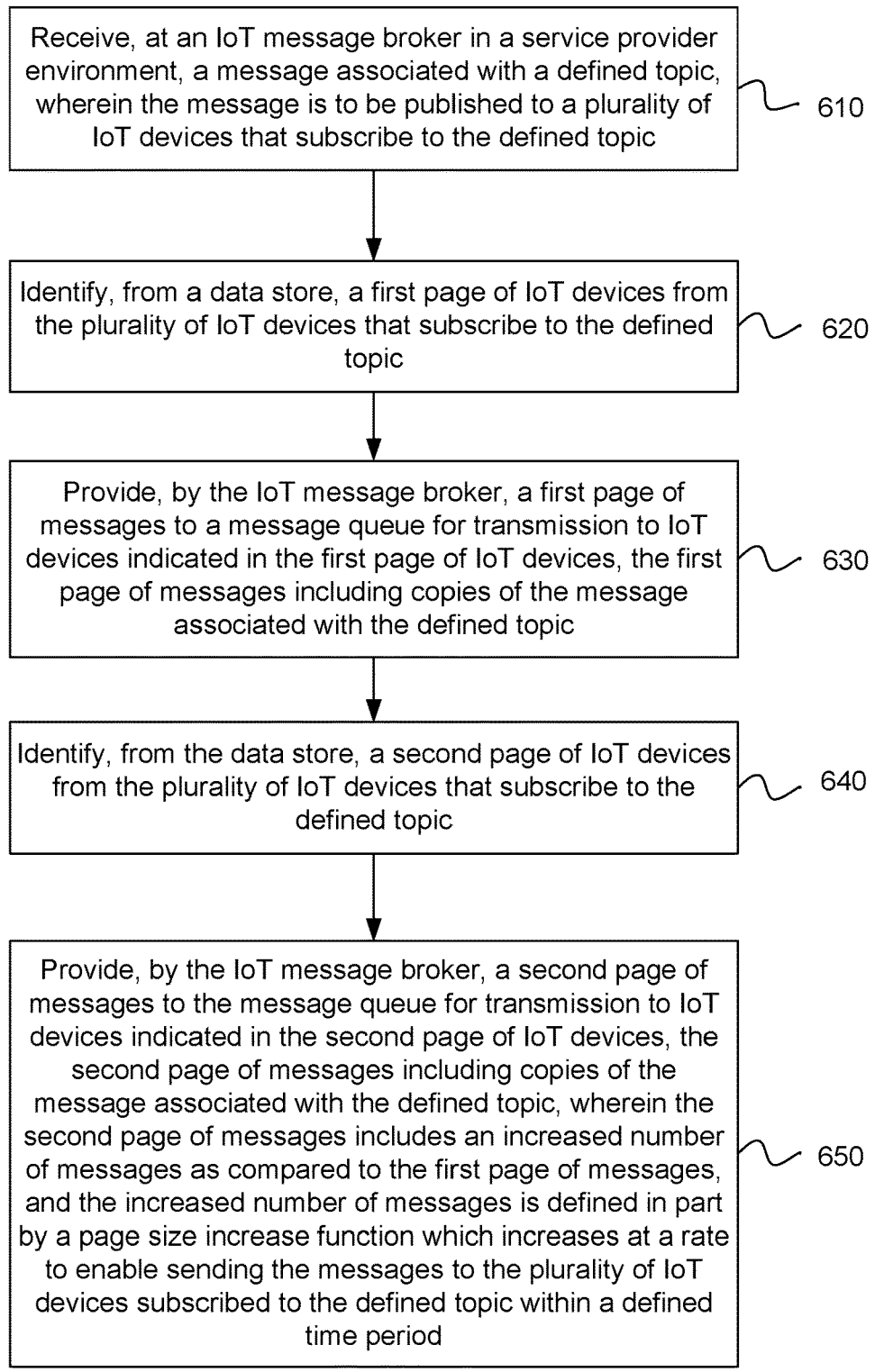
FIG. 6 is a flowchart of an example method for sending subscription-based messages to Internet of Things (IoT) devices.

FIG. 6 illustrates an example of a method for sending subscription-based messages to Internet of Things (IoT) devices. A message associated with a defined topic may be received at an IoT message broker in a service provider environment, as in block 610. The message may be received at the IoT message broker in order to be published to a plurality of IoT devices that subscribe to the defined topic. In other words, the IoT message broker may receive the message with the defined topic from a certain IoT device, and then forward the message to the plurality of IoT devices that subscribe to messages with the same defined topic.

A first page of IoT devices may be identified from the plurality of IoT devices that subscribe to the defined topic, as in block 620. The first page of IoT devices may be identified from a data store that is accessible to the IoT message broker. The data store may maintain a tree data structure that indicates a plurality of IoT devices that subscribe to messages corresponding to a plurality of defined topics. In addition, the first page of IoT devices may be in accordance with a first page size.

A first page of messages may be provided by the IoT message broker to a message queue for transmission to IoT devices indicated in the first page of IoT devices, as in block 630. The message queue may be a repository of messages that are waiting to be processed. For example, the messages in the message queue may be waiting to be picked up by a thread and sent to an appropriate IoT device. The first page of messages may include copies of the message associated with the defined topic, and a copy of the message may be sent to each IoT device in the first page of IoT devices.

A second page of IoT devices may be identified from the plurality of IoT devices that subscribe to the defined topic, as in block 640. The second page of IoT devices may be identified from the data store that is accessible to the IoT message broker. The second page of IoT devices may be in accordance with a second page size.

A second page of messages may be provided by the IoT message broker to the message queue for transmission to IoT devices indicated in the second page of IoT devices, as in block 650. The second page of messages may include copies of the message associated with the defined topic. The second page of messages may include an increased number of messages as compared to the first page of messages. The increased number of messages may be defined in part by a page size increase function which increases at a rate to enable sending the messages to the plurality of IoT devices subscribed to the defined topic within a defined time period.

In one example, additional pages of IoT devices may be requested from the data store. The additional pages of IoT devices may be from the plurality of IoT devices that subscribe to the defined topic. The additional pages of messages may be provided by the IoT message broker to the message queue for transmission to IoT devices indicated in the additional pages of IoT devices. The additional pages of messages may be transmitted until each of the plurality of IoT devices subscribed to the defined topic receives the message sent to the defined topic.

In another example, the page size increase function can define a rate of increase between the first page of messages and the second page of messages to be linear, or the page size increase function can define a rate of increase between the first page of messages and the second page of messages to be exponential.

In yet another example, the page size increase function can be calculated based on a combination of: a number of IoT devices that subscribe to the defined topic, a targeted period of time for transmitting messages to the IoT devices, a targeted number of pages to be utilized for transmitting the messages to the IoT devices, and a failure risk factor for each page of messages that are transmitted to the IoT devices. In addition, the page size increase function may be calculated using topic based heuristics, account based heuristics and/or machine learning heuristics.

In one configuration, the first page of IoT devices may be received from the data store with a token. The token may indicate an existence of additional IoT devices for which the message with the defined topic is to be transmitted. The second page of IoT devices may be requested from the data store using the token.

Figure 7:
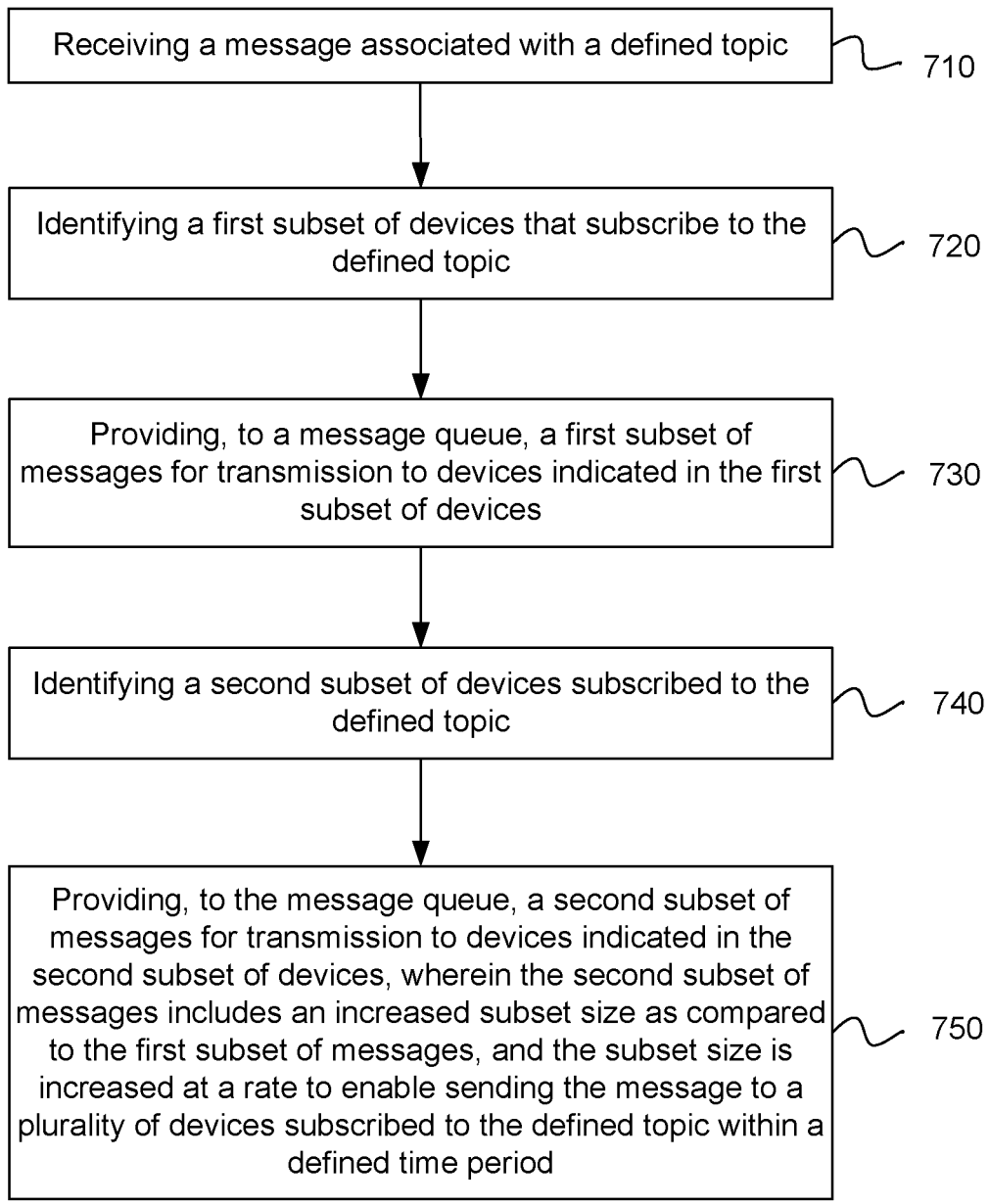
FIG. 7 is a flowchart of another example method for sending subscription-based messages to Internet of Things (IoT) devices.

FIG. 7 illustrates an example of a method for sending subscription-based messages to devices. The devices may include Internet of Things (IoT) devices. A message associated with a defined topic may be received, as in block 710. The message may be received at a message broker, and the message may be destined to be forwarded to a plurality of devices that subscribe to messages with the defined topic.

A first subset of devices may be identified that subscribe to the defined topic, as in block 720. The first subset of devices may be identified using a data store, and the data store may maintain a tree data structure that indicates a plurality of devices that subscribe to messages corresponding to a plurality of defined topics. The first subset of devices may also be referred to as a first page of devices.

A first subset of messages may be provided to a message queue for transmission to devices indicated in the first subset of devices, as in block 730. The first subset of messages may include copies of the message associated with the defined topic destined for the plurality of devices. The first subset of messages may also be referred to as a first page of messages.

A second subset of devices may be identified that subscribe to the defined topic, as in block 740. The second subset of devices may be identified using the data store. The second subset of devices may also be referred to as a second page of devices.

A second subset of messages may be provided to the message queue for transmission to devices indicated in the second subset of devices, as in block 750. The second subset of messages may also be referred to as a second page of messages. The second subset of messages may include an increased subset size as compared to the first subset of messages, wherein the subset size may be increased at a rate to enable sending the message to the plurality of devices subscribed to the defined topic within a defined time period.

In one configuration, the subset size for the subset of messages may increase over time using a subset size increase function, and the subset size increase function may increase at a rate to enable sending the messages to the plurality of devices subscribed to the defined topic within the defined time period. In another configuration, a rate of increase in the subset size between each successive subset of messages is linear, a rate of increase in the subset size between each successive subset of messages is exponential, or a rate of increase in the subset size between each successive subset of messages is in accordance with a predefined pattern. In yet another configuration, a rate of increase in the subset size between each successive subset of messages is calculated based on a combination of: a number of devices that subscribe to the defined topic, a targeted period of time for transmitting messages to the devices, a targeted number of subsets to be utilized for transmitting the messages to the devices, and a failure risk factor for each subset of messages that are transmitted to the devices. In addition, the rate of increase in the subset size between each successive subset of messages may be calculated using topic based heuristics, account based heuristics and/or machine learning heuristics.

In one example, it may be determined that an error occurs when a defined subset of messages are transmitted from the message queue to devices. A copy of the defined subset of messages may be provided to the message queue for retransmission to the devices.

In one example, a defined number of threads may poll the message queue for messages, and messages that are returned by the message queue may be transmitted to devices via the defined number of threads. The defined number of threads may increase when polling of the message queue produces a number of messages that are above a defined threshold, or the defined number of threads may decrease when polling of the message queue produces a number of messages that are below the defined threshold.

In one configuration, the subset of messages may be provided to the message queue using a message broker, and the message broker may be a publisher-subscriber broker service that enables a sending of messages with defined topics to the plurality of devices. In another configuration, the subset size may be limited to a defined maximum value, and the defined maximum value may be selected to minimize the defined time period for sending the messages to the plurality of device subscribed to the defined topic and a failure risk factor for each subset of messages that is transmitted to the devices.

Figure 8:
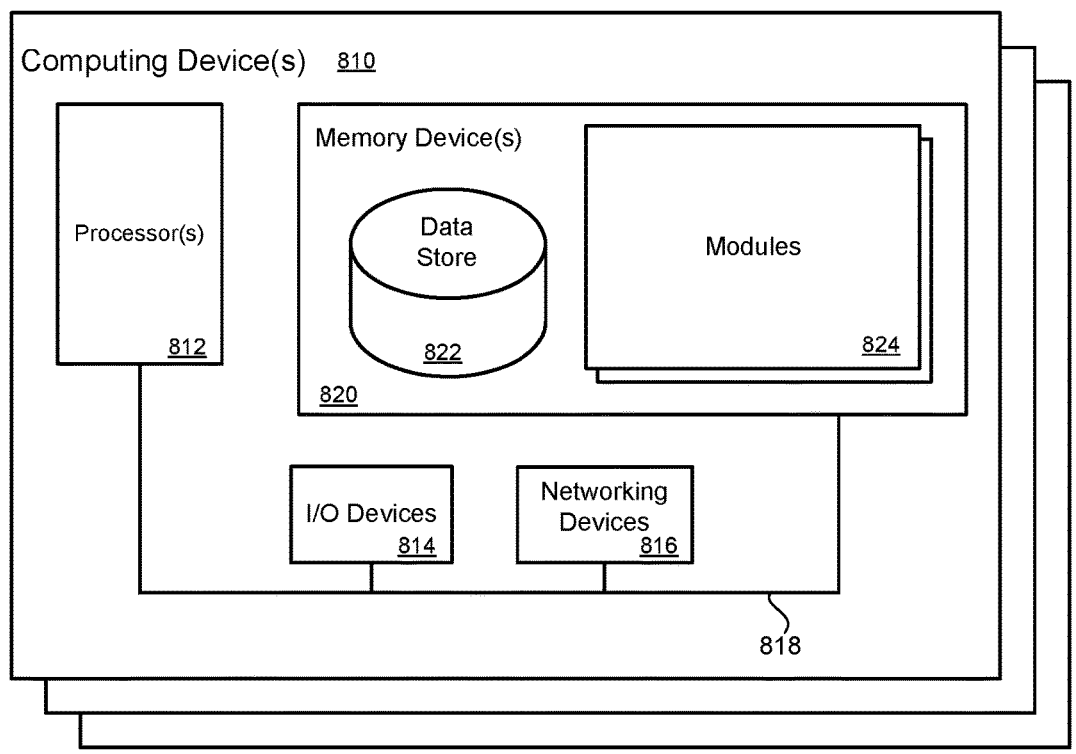
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

Figure 9:
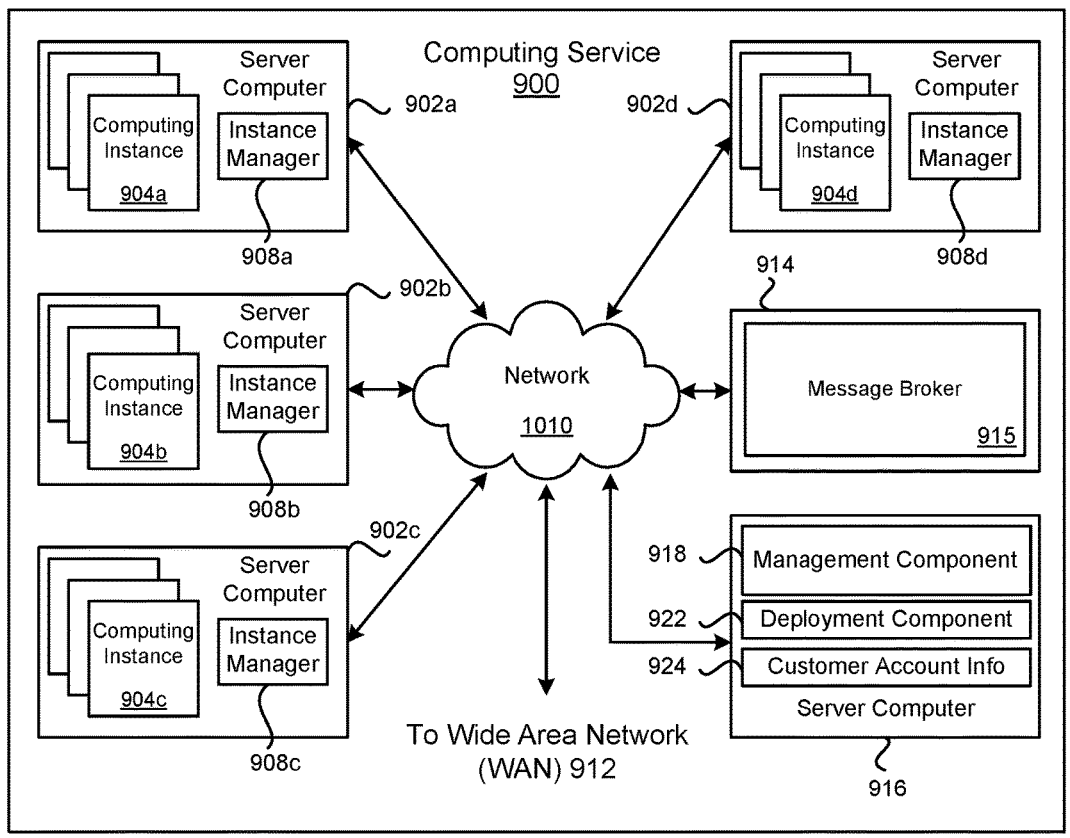
FIG. 9 is a block diagram of a service provider environment according to an example of the present technology.

FIG. 9 is a block diagram illustrating an example computing service 900 that may be used to execute and manage a number of computing instances 904a-d upon which the present technology may execute. In particular, the computing service 900 depicted illustrates one environment in which the technology described herein may be used. The computing service 900 may be one type of environment that includes various virtualized service resources that may be used, for instance, to host computing instances 904a-d.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS"), Platform as a Service ("PaaS"), and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902a-d. The server computers 902a-d may also be known as physical hosts. While four server computers are shown, any number may be used, and large data centers may include thousands of server computers. The computing service 900 may provide computing resources for executing computing instances 904a-d. Computing instances 904a-d may, for example, be virtual machines. A virtual machine may be an instance of a software implementation of a machine (i.e. a computer) that executes applications like a physical machine. In the example of a virtual machine, each of the server computers 902a-d may be configured to execute an instance manager 908a-d capable of executing the instances. The instance manager 908a-d may be a hypervisor, virtual machine manager (VMM), or another type of program configured to enable the execution of multiple computing instances 904a-d on a single server. Additionally, each of the computing instances 904a-d may be configured to execute one or more applications.

A server 914 may be reserved to execute software components for implementing the present technology or managing the operation of the computing service 900 and the computing instances 904a-d. For example, the server computer 914 may execute a message broker 915 operable to send subscription-based messages to Internet of Things (IoT) devices. The message broker 915 may receive a message associated with a defined topic. The message broker 915 may identify, from a data store, a first page of IoT devices from a plurality of IoT devices that subscribe to the defined topic. The message broker 915 may provide a first page of messages to a message queue for transmission to the first page of IoT devices, and the first page of messages may include copies of the message associated with the defined topic. The message broker 915 may identify, from the data store, a second page of IoT devices from the plurality of IoT devices that subscribe to the defined topic. The message broker 915 may provide a second page of messages to the message queue for transmission to the second page of IoT devices. The second page of messages may include copies of the message associated with the defined topic. The second page of messages may include an increased number of messages as compared to the first page of messages. The increased number of messages may be defined in part by a page size increase function which increases at a rate to enable sending the messages to the plurality of IoT devices subscribed to the defined topic within a defined time period.

A server computer 916 may execute a management component 918. A customer may access the management component 918 to configure various aspects of the operation of the computing instances 904a-d purchased by a customer. For example, the customer may setup computing instances 904a-d and make changes to the configuration of the computing instances 904a-d.

A deployment component 922 may be used to assist customers in the deployment of computing instances 904a-d. The deployment component 922 may have access to account information associated with the computing instances 904a-d, such as the name of an owner of the account, credit card information, country of the owner, etc. The deployment component 922 may receive a configuration from a customer that includes data describing how computing instances 904a-d may be configured. For example, the configuration may include an operating system, provide one or more applications to be installed in computing instances 904a-d, provide scripts and/or other types of code to be executed for configuring computing instances 904a-d, provide cache logic specifying how an application cache is to be prepared, and other types of information. The deployment component 922 may utilize the customer-provided configuration and cache logic to configure, prime, and launch computing instances 904a-d. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902a-d, 916. The network 910 may be a local area network (LAN) and may be connected to a Wide Area Network (WAN) 912 or the Internet, so that end customers may access the computing service 900. In addition, the network 910 may include a virtual network overlaid on the physical network to provide communications between the servers 902a-d. The network topology illustrated in FIG. 9 has been simplified, as many more networks and networking devices may be utilized to interconnect the various computing systems disclosed herein.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon for sending subscription-based messages to Internet of Things (IoT) devices, the instructions being executed by one or more processors to cause a computer system to:

receive, at an IoT message broker in a service provider environment, a message associated with a defined topic, wherein the message is to be published to a plurality of IoT devices that subscribe to the defined topic;

identify, from a data store, a first page of IoT devices from the plurality of IoT devices that subscribe to the defined topic;

provide, by the IoT message broker, a first page of messages to a message queue for transmission to IoT devices indicated in the first page of IoT devices, the first page of messages including copies of the message associated with the defined topic;

identify, from the data store, a second page of IoT devices from the plurality of IoT devices that subscribe to the defined topic; and provide, by the IoT message broker, a second page of messages to the message queue for transmission to IoT devices indicated in the second page of IoT devices, the second page of messages including copies of the message associated with the defined topic, wherein the second page of messages includes an increased number of messages as compared to the first page of messages, and the increased number of messages is defined in part by a page size increase function which increases at a rate to enable sending the messages to the plurality of IoT devices subscribed to the defined topic within a defined time period.

2. The non-transitory machine readable storage medium of claim 1, further comprising instructions that upon execution cause the computer system to:
request, from the data store, additional pages of IoT devices from the plurality of IoT devices that subscribe to the defined topic; and
provide, by the IoT message broker, additional pages of messages to the message queue for transmission to IoT devices indicated in the additional pages of IoT devices, wherein the additional pages of messages are transmitted until each of the plurality of IoT devices subscribed to the defined topic receive the message sent to the defined topic, and the additional pages include an increasing page size of messages in accordance with the page size increase function.

3. The non-transitory machine readable storage medium of claim 1, wherein:
the page size increase function defines a rate of increase between the first page of messages and the second page of messages to be linear; or
the page size increase function defines a rate of increase between the first page of messages and the second page of messages to be exponential.

4. The non-transitory machine readable storage medium of claim 1, wherein the page size increase function is calculated based on at least one of: a number of IoT devices that subscribe to the defined topic, a targeted period of time for transmitting messages to the IoT devices, a targeted number of pages to be utilized for transmitting the messages to the IoT devices, or a failure risk factor for each page of messages that are transmitted to the IoT devices.

5. The non-transitory machine readable storage medium of claim 1, further comprising instructions that upon execution cause the computer system to:
receive, from the data store, the first page of IoT devices with a token, wherein the token indicates an existence of additional IoT devices for which the message with the defined topic is to be transmitted; and
request, from the data store, the second page of IoT devices using the token.

6. A method for sending subscription-based messages to devices, the method comprising:
receiving a message associated with a defined topic;
identifying a first subset of devices that subscribe to the defined topic;
providing, to a message queue, a first subset of messages for transmission to devices indicated in the first subset of devices;
identifying a second subset of devices subscribed to the defined topic; and
providing, to the message queue, a second subset of messages for transmission to devices indicated in the second subset of devices, wherein the second subset of messages includes an increased subset size as compared to the first subset of messages, and the subset size is increased at a rate to enable sending the message to a plurality of devices subscribed to the defined topic within a defined time period.

7. The method of claim 6, wherein the subset size for the subset of messages increases over time using a subset size increase function, and the subset size increase function increases at a rate to enable sending the messages to the plurality of devices subscribed to the defined topic within the defined time period.

8. The method of claim 6, wherein:
a rate of increase in the subset size between successive subsets of messages is linear;
a rate of increase in the subset size between successive subsets of messages is exponential; or
a rate of increase in the subset size between successive subsets of messages is in accordance with a predefined pattern.

9. The method of claim 6, wherein a rate of increase in the subset size between successive subsets of messages is calculated based on at least one of: a number of devices that subscribe to the defined topic, a targeted period of time for transmitting messages to the devices, a targeted number of subsets to be utilized for transmitting the messages to the devices, or a failure risk factor for each subset of messages that are transmitted to the devices.

10. The method of claim 6, further comprising maintaining a tree data structure in a data store, and the tree data structure indicates a plurality of devices that subscribe to messages corresponding to a plurality of defined topics.

11. The method of claim 6, further comprising:
determining that an error occurs when a defined subset of messages are transmitted from the message queue to devices; and
providing a copy of the defined subset of messages to the message queue for retransmission to the devices.

12. The method of claim 6, wherein a defined number of threads poll the message queue for messages, and messages that are returned by the message queue are transmitted to devices via the defined number of threads.

13. The method of claim 12, wherein:
the defined number of threads increase when polling of the message queue produces a number of messages that are above a defined threshold; or
the defined number of threads decreases when polling of the message queue produces a number of messages that are below the defined threshold.

14. The method of claim 6, wherein the subset of messages are provided to the message queue using a message broker, wherein the message broker is a publisher-subscriber broker service that enables a sending of messages with defined topics to the plurality of devices.

15. The method of claim 6, wherein the subset size is limited to a defined maximum value, and the defined maximum value is selected to minimize the defined time period for sending the messages to the plurality of devices subscribed to the defined topic and a failure risk factor for each subset of messages that is transmitted to the devices.

16. A system for sending subscription-based messages to Internet of Things (IoT) devices, the system device comprising:
a processor;
a memory device including a data store to store a plurality of data and instructions that, when executed by the processor, cause the processor to:
receive a message associated with a defined topic;
identify a first page of IoT devices from a plurality of IoT devices that subscribe to the defined topic;
provide a first page of messages to a message queue for transmission to IoT devices indicated in the first page of IoT devices, the first page of messages including copies of the message associated with the defined topic;
identify a second page of IoT devices from the plurality of IoT devices that subscribe to the defined topic; and
provide a second page of messages to the message queue for transmission to IoT devices indicated in the second page of IoT devices, the second page of messages including copies of the message associated with the defined topic, wherein the second page of messages includes an increased number of messages as compared to the first page of messages, and the increased number of messages is defined in part by a page size increase function which increases at a rate to enable sending the messages to the plurality of IoT devices subscribed to the defined topic within a defined time period.

17. The system of claim 16, wherein the plurality of data and instructions, when executed by the processor, cause the processor to:
request additional pages of IoT devices from the plurality of IoT devices that subscribe to the defined topic; and
provide additional pages of messages to the message queue for transmission to IoT devices indicated in the additional pages of IoT devices, wherein the additional pages of messages are transmitted until each of the plurality of IoT devices subscribed to the defined topic receive the message sent to the defined topic, and the additional pages include an increasing page size of messages in accordance with the page size increase function.

18. The system of claim 16, wherein:
the page size increase function defines a rate of increase between the first page of messages and the second page of messages to be linear;
the page size increase function defines a rate of increase between the first page of messages and the second page of messages to be exponential; or
the page size increase function defines a rate of increase between the first page of messages and the second page of messages to be in accordance with a predefined pattern.

19. The system of claim 16, wherein the page size increase function is calculated based on at least one of: topic based heuristics, account based heuristics or machine learning heuristics.

20. The system of claim 16, wherein the plurality of data and instructions, when executed by the processor, cause the processor to:
receive the first page of IoT devices with a token, wherein the token indicates an existence of additional IoT devices for which the message with the defined topic is to be transmitted; and
request the second page of IoT devices using the token.

* * * * *